(12) United States Patent
Hori et al.

(10) Patent No.: US 11,917,462 B2
(45) Date of Patent: Feb. 27, 2024

(54) TERMINAL APPARATUS AND METHOD

(71) Applicant: Sharp Kabushiki Kaisha, Sakai (JP)

(72) Inventors: Takako Hori, Sakai (JP); Shohei Yamada, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 388 days.

(21) Appl. No.: 17/287,259

(22) PCT Filed: Nov. 1, 2019

(86) PCT No.: PCT/JP2019/043045
§ 371 (c)(1),
(2) Date: Apr. 21, 2021

(87) PCT Pub. No.: WO2020/091048
PCT Pub. Date: May 7, 2020

(65) Prior Publication Data
US 2021/0400544 A1 Dec. 23, 2021

(30) Foreign Application Priority Data
Nov. 1, 2018 (JP) .................. 2018-206553

(51) Int. Cl.
*H04W 36/00* (2009.01)
*H04W 76/34* (2018.01)

(52) U.S. Cl.
CPC ....... *H04W 36/0069* (2018.08); *H04W 76/34* (2018.02)

(58) Field of Classification Search
CPC ......... H04W 36/0055; H04W 36/0061; H04W 36/0069; H04W 36/00692; H04W 36/00695; H04W 36/00698; H04W 36/00837; H04W 76/30; H04W 76/32; H04W 76/34; H04W 76/36
See application file for complete search history.

(56) References Cited

U.S. PATENT DOCUMENTS

2016/0302256 A1  10/2016  Susitaival et al.
2020/0374961 A1* 11/2020  Ingale ............... H04W 76/20

FOREIGN PATENT DOCUMENTS

| EP | 3 125 640 A1 | 2/2017 |
| JP | 2017-514367 A | 6/2017 |
| JP | 2017-531961 A | 10/2017 |

OTHER PUBLICATIONS

Official Communication issued in International Patent Application No. PCT/JP2019/043045, dated Jan. 28, 2020.
(Continued)

*Primary Examiner* — Matthew W Genack
(74) *Attorney, Agent, or Firm* — Keating & Bennett, LLP

(57) ABSTRACT

A terminal apparatus includes: a processing unit configured to determine, in a case that the terminal apparatus requests re-establishment of an RRC connection, whether or not the terminal apparatus is configured with NGEN-DC, release, in a case that the terminal apparatus is configured with NGEN-DC, an NR secondary cell group, and release, in the release of the NR secondary cell group, an RLC entity for an RLC bearer configured for the NR secondary group.

4 Claims, 12 Drawing Sheets

UE122

S700
DETERMINE WHETHER OR NOT RELEASE OF E-UTRA SECONDARY CELL GROUP IN MR-DC IS TRIGGERED FROM MCG SIDE TO E-UTRA SIDE IN INSIDE OF UE.

S702
BASED ON FACT THAT RELEASE OF E-UTRA SECONDARY CELL GROUP IN MR-DC IS TRIGGERED FROM MCG SIDE TO E-UTRA SIDE, RELEASE RLC ENTITY FOR EACH RLC BEARER CONFIGURED IN E-UTRA SECONDARY CELL GROUP IN MR-DC. RELEASE OF RLC ENTITY DESCRIBED ABOVE MAY BE PERFORMED AFTER RE-ESTABLISHMENT OF RLC ENTITY.

S704
IN ADDITION TO PROCESSING IN STEP S702, BASED ON FACT THAT RELEASE OF E-UTRA SECONDARY CELL GROUP IN MR-DCI IS TRIGGERED FROM NR SIDE TO E-UTRA SIDE, PERFORM RELEASE OF MEASUREMENT CONFIGURATION AND/OR RELEASE OF MAC OF SECONDARY CELL GROUP IN A CASE THAT MAC OF SECONDARY CELL GROUP IS PRESENT AND/OR RELEASE OF SECONDARY CELL GROUP AND/OR STOP OF TIMER FOR DETERMINING RADIO LINK FAILURE OF SECONDARY CELL GROUP AND/OR STOP OF TIMER FOR DETERMINING CHANGE FAILURE OF SECONDARY CELL GROUP.

(56) References Cited

OTHER PUBLICATIONS

NTT DOCOMO, Inc., "New WID on New Radio Access Technology", 3GPP TSG RAN Meeting #75, RP-170855, Mar. 6-9, 2017, 8 pages.
"3rd Generation Partnership Project; Technical Specification Group Services and System Aspects; System Architecture for the 5G System; Stage 2 (Release 15)", 3GPP TS 23.501 V15.3.0, Sep. 2018, pp. 1-226.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.3.0, Sep. 2018, pp. 1-358.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, pp. 1-918.
"3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.1.0, Sep. 2018, pp. 1-51.
"3rd Generation Partnership Project; Technical Specification Group Radio Access Network; Evolved Universal Terrestrial Radio Access (E-UTRA); Radio Link Control (RLC) protocol specification (Release 15)", 3GPP TS 36.322 V15.1.0, Jul. 2018, pp. 1-45.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.3.0, Sep. 2018, pp. 1-127.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.3.0, Sep. 2018, pp. 1-59.
"3rd Generation Partnership Project; Technical Specification Group Radio Access Network; NR; NR and NG-RAN Overall Description; Stage 2 (Release 15)", 3GPP TS 38.300 V15.3.1, Oct. 2018, pp. 1-92.
"3rd Generation Partnership Project; Technical Specification Group Radio Access Network; NR; Radio Resource Control (RRC) protocol specification (Release 15)", 3GPP TS 38.331 V15.3.0, Sep. 2018, pp. 1-445.
"3rd Generation Partnership Project; Technical Specification Group Radio Access Network; NR; Packet Data Convergence Protocol (PDCP) specification (Release 15)", 3GPP TS 38.323 V15.3.0, Sep. 2018, pp. 1-26.
"3rd Generation Partnership Project; Technical Specification Group Radio Access Network; NR; Radio Link Control (RLC) protocol specification (Release 15)", 3GPP TS 38.322 V15.3.0, Sep. 2018, pp. 1-33.
"3rd Generation Partnership Project; Technical Specification Group Radio Access Network; NR; Medium Access Control (MAC) protocol specification (Release 15)", 3GPP TS 38.321 V15.3.0, Sep. 2018, pp. 1-76.
"3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.3.0, Mar. 2017, pp. 1-386.
"3rd Generation Partnership Project; Technical Specification Group Services and System Aspects; Procedures for the 5G System; Stage 2 (Release 15)", 3GPP TS 23.502 V15.3.0, Sep. 2018, pp. 1-329.
"3rd Generation Partnership Project; Technical Specification Group Radio Access Network; E-UTRA and NR; Service Data Adaptation Protocol (SDAP) specification (Release 15)", 3GPP TS 37.324 V15.1.0, Sep. 2018, pp. 1-13.
T-Mobile, "5G Architecture Options—Full Set", Joint RAN/SA Meeting, RP-161266, Jun. 14, 2016, 11 pages.
Interdigital (rapporteur), "Summary of [103#50][NR late drop]—MR-DC configuration in Inactive (Interdigital)", 3GPP TSG-RAN WG2 Meeting #103bis, R2-1814021, Oct. 8-12, 2018, pp. 1-18.
OPPO, "Discussion on PDCP usage for RRC connection reestablishment for NG-ENDC", 3GPP TSG-RAN2 Meeting AH#1807, R2-1809812, Jul. 2-6, 2018, 2 pages.
OPPO, "Discussion on Stage-2 Issue for NG-ENDC", 3GPP TSG-RAN2 Meeting AH#1807, R2-1809935, Jul. 2-6, 2018, 2 pages.
Huawei et al., "MCG SCG failure handling in NR-DC", 3GPP TSG-RAN WG2#103bis, R2-1814115, Oct. 8-12, 2018, 3 pages.
Samsung, "MR-DC configuration in inactive state", 3GPP TSG-RAN WG2 Meeting #103, R2-1812538, Aug. 20-24, 2018, pp. 1-4.

* cited by examiner

UE122

S700: DETERMINE WHETHER OR NOT RELEASE OF E-UTRA SECONDARY CELL GROUP IN MR-DC IS TRIGGERED FROM MCG SIDE TO E-UTRA SIDE IN INSIDE OF UE.

↓

S702: BASED ON FACT THAT RELEASE OF E-UTRA SECONDARY CELL GROUP IN MR-DC IS TRIGGERED FROM MCG SIDE TO E-UTRA SIDE, RELEASE RLC ENTITY FOR EACH RLC BEARER CONFIGURED IN E-UTRA SECONDARY CELL GROUP IN MR-DC. RELEASE OF RLC ENTITY DESCRIBED ABOVE MAY BE PERFORMED AFTER RE-ESTABLISHMENT OF RLC ENTITY.

↓

S704: IN ADDITION TO PROCESSING IN STEP S702, BASED ON FACT THAT RELEASE OF E-UTRA SECONDARY CELL GROUP IN MR-DCI IS TRIGGERED FROM NR SIDE TO E-UTRA SIDE, PERFORM RELEASE OF MEASUREMENT CONFIGURATION AND/OR RELEASE OF MAC OF SECONDARY CELL GROUP IN A CASE THAT MAC OF SECONDARY CELL GROUP IS PRESENT AND/OR RELEASE OF SECONDARY CELL GROUP AND/OR STOP OF TIMER FOR DETERMINING RADIO LINK FAILURE OF SECONDARY CELL GROUP AND/OR STOP OF TIMER FOR DETERMINING CHANGE FAILURE OF SECONDARY CELL GROUP.

FIG. 7

```
<OMITTED>
RRCReconfiguration-IEs ::=    SEQUENCE {
    <PARTLY OMITTED>
    radioBearerConfig          RadioBearerConfig       OPTIONAL, -- Need M
    <PARTLY OMITTED>
}

RadioBearerConfig ::=          SEQUENCE {
    <PARTLY OMITTED>
    nedc-ReleaseAndAdd-r15     BOOLEAN                 OPTIONAL, -- Need N
    <PARTLY OMITTED>
}

<OMITTED>
```

FIG. 9

TERMINAL APPARATUS AND METHOD

TECHNICAL FIELD

The present invention relates to a terminal apparatus and a method. This application claims priority based on JP 2018-206553 filed on Nov. 1, 2018, the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (E-UTRA)") and a core network (which will be referred to as "Evolved Packet Core or EPC") have been studied by the 3rd Generation Partnership Project (3GPP).

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (Non Patent Literature (NPL) 1). Furthermore, 5 Generation Core Network (5GC), which is a core network for the 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501 v15.3.0, "System Architecture for the 5G System; Stage 2"
NPL 3: 3GPP TS 36.300 v15.3.0, "Evolved Universal Terrestrial Radio Access (E-UTRA) and Evolved Universal Terrestrial Radio Access Network (E-UTRAN); Overall description; Stage 2"
NPL 4: 3GPP TS 36.331 v15.3.0, "Evolved Universal Terrestrial Radio Access (E-UTRA); Radio Resource Control (RRC); Protocol specifications"
NPL 5: 3GPP TS 36.323 v15.1.0, "Evolved Universal Terrestrial Radio Access (E-UTRA); Packet Data Convergence Protocol (PDCP) specification"
NPL 6: 3GPP TS 36.322 v15.1.0, "Evolved Universal Terrestrial Radio Access (E-UTRA); Radio Link Control (RLC) protocol specification"
NPL 7: 3GPP TS 36.321 v15.3.0, "Evolved Universal Terrestrial Radio Access (E-UTRA); Medium Access Control (MAC) protocol specification"
NPL 8: 3GPP TS 37.340 v15.3.0, "Evolved Universal Terrestrial Radio Access (E-UTRA) and NR; Multi-Connectivity; Stage 2"
NPL 9: 3GPP TS 38.300 v15.3.1, "NR; NR and NG-RAN Overall description; Stage 2"
NPL 10: 3GPP TS 38.331 v15.3.0, "NR; Radio Resource Control (RRC); Protocol specifications"
NPL 11: 3GPP TS 38.323 v15.3.0, "NR; Packet Data Convergence Protocol (PDCP) specification"
NPL 12: 3GPP TS 38.322 v15.3.0, "NR; Radio Link Control (RLC) protocol specification"
NPL 13: 3GPP TS 38.321 v15.3.0, "NR; Medium Access Control (MAC) protocol specification"
NPL 14: 3GPP TS 23.401 v14.3.0, "General Packet Radio Service (GPRS) enhancements for Evolved Universal Terrestrial Radio Access Network (E-UTRAN) access"
NPL 15: 3GPP TS 23.502 v15.3.0, "Procedure for 5G System; Stage 2"
NPL 16: 3GPP TS 37.324 v15.1.0, "NR; Service Data Adaptation Protocol (SDAP) Specification"
NPL 17: 3GPP RP-161266, "5G Architecture Options-Full Set"

SUMMARY OF INVENTION

Technical Problem

As one of the technical studies of NR, a mechanism called Multi-RAT Dual Connectivity (MR-DC) is being studied that allows cells of radio access technologies (RATs) of both E-UTRA and NR to be grouped into a cell group on a RAT basis and to be allocated to UE such that a terminal apparatus communicates with one or more base station apparatuses (NPL 8).

However, since the formats and functions of the communication protocols used in the E-UTRA and the NR differ, and since core networks to be used differ depending on forms of MR-DC as described in NPL 8, there is a problem in that the protocol processing becomes complex compared to existing Dual Connectivity in LTE using only E-UTRA as a RAT and using only EPC which is a core network of LTE as a core network, and thus a base station apparatus and a terminal apparatus are not able to efficiently communicate with each other.

One aspect of the present invention is realized with the situations described above taken into account, and one object thereof is to provide a terminal apparatus capable of efficiently communicating with a base station apparatus, a base station apparatus, a method used for the terminal apparatus, and an integrated circuit mounted in the terminal apparatus.

Solution to Problem

In order to accomplish the object described above, an aspect of the present invention is contrived to provide the following measures. That is, a terminal apparatus includes: a processing unit configured to determine, in a case that the terminal apparatus requests re-establishment of an RRC connection, whether or not the terminal apparatus is configured with NGEN-DC, release, in a case that the terminal apparatus is configured with NGEN-DC, an NR secondary cell group, and release, in the release of the NR secondary cell group, an RLC entity for an RLC bearer configured for the NR secondary group.

Furthermore, an aspect of the present invention is a terminal apparatus including: a processing unit configured to determine, in a case that the terminal apparatus requests resumption of an RRC connection suspended, whether or not the terminal apparatus has been configured with NGEN-DC during the suspend of the RRC connection, release, in a case that the terminal apparatus has been configured with NGEN-DC, an NR secondary cell group, and release, in the release of the NR secondary cell group, an RLC entity for an RLC bearer configured for the NR secondary group.

Furthermore, an aspect of the present invention is a method of a terminal apparatus, the method including the steps of: determining, in a case that the terminal apparatus requests re-establishment of an RRC connection, whether or not the terminal apparatus is configured with NGEN-DC;

releasing, in a case that the terminal apparatus is configured with NGEN-DC, an NR secondary cell group; and releasing, in the release of the NR secondary cell group, an RLC entity for an RLC bearer configured for the NR secondary group.

Furthermore, an aspect of the present invention is a method of a terminal apparatus, the method including the steps of: determining, in a case that the terminal apparatus requests resumption of an RRC connection suspended, whether or not the terminal apparatus has been configured with NGEN-DC during the suspend of the RRC connection; releasing, in a case that the terminal apparatus has been configured with NGEN-DC, an NR secondary cell group; and releasing, in the release of the NR secondary cell group, an RLC entity for an RLC bearer configured for the NR secondary group.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to one aspect of the present invention, a terminal apparatus can efficiently perform communication by reducing complexity of protocol processing.

BRIEF DESCRIPTION OF DRAWINGS

FIG. 7 illustrates an example of a processing method of a UE 122 according to Embodiment 1 of the present invention.

FIG. 9 illustrates an example of an ASN.1 description of information, included in an RRC reconfiguration message, for indicating that release and addition of a configuration related to a secondary cell group are simultaneously performed, according to Embodiment 1 of the present invention.

DESCRIPTION OF EMBODIMENTS

Hereinafter, embodiments of the present invention will be described in detail with reference to the drawings.

LTE (and LTE-A Pro) and NR may be defined as different RATs. The NR may be defined as a technology included in the LTE. The LTE may be defined as a technology included in the NR. In addition, the LTE that is connectable to the NR using Multi RAT Dual connectivity may be distinguished from the existing LTE. The present embodiment may be applied to the NR, the LTE and other RATs. Terms associated with the LTE and the NR are used in the following description. However, the present invention may be applied to other technologies using other terms. In this embodiment, the term "E-UTRA" may be replaced with "LTE," and the term "LTE" may be replaced with "E-UTRA".

Figure 1:
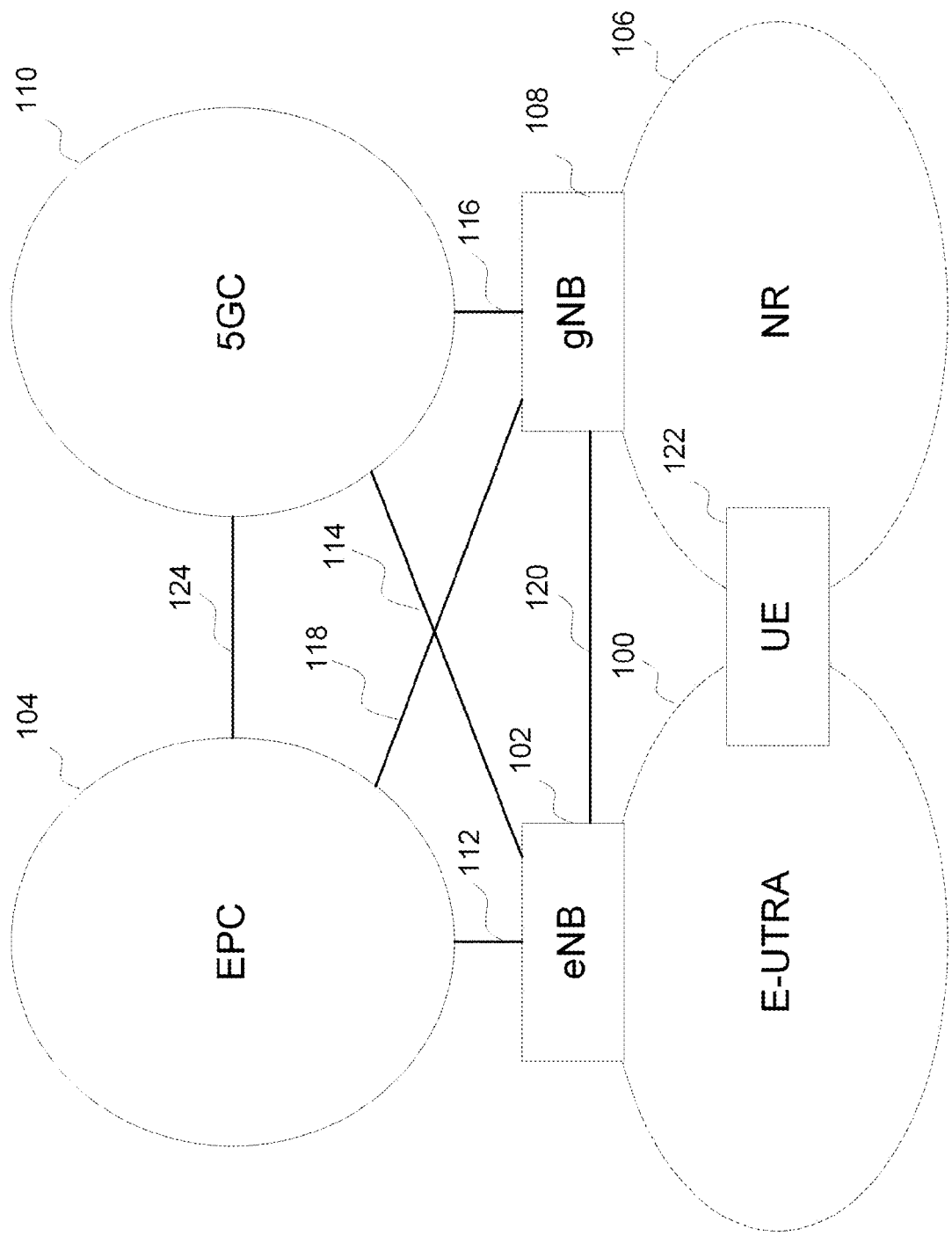
FIG. 1 is a schematic diagram of a communication system according to each embodiment of the present invention.

FIG. 1 is a schematic diagram of a communication system according to each embodiment of the present invention.

An E-UTRA 100 is a radio access technology described in NPL 3 or the like, and includes a cell group (CG) configured in one or multiple frequency bands. An E-UTRAN Node B (eNB) 102 is a base station apparatus of the E-UTRA. An Evolved Packet Core (EPC) 104 is a core network described in NPL 14 or the like and is designed as a core network for the E-UTRA. An interface 112 is an interface between the eNB 102 and the EPC 104, where there is a control plane (CP) through which control signals are transferred and a user plane (UP) through which user data is transferred.

An NR 106 is a radio access technology described in NPL 9 and the like, and includes a cell group (CG) configured in one or multiple frequency bands. A gNode B (gNB) 108 is an NR base station apparatus. A 5GC 110 is a core network described in NPL 2 and the like, is designed as a core network for NR, but may also be used as a core network of E-UTRA having a function of connecting to 5CG. Hereinafter, the E-UTRA may include E-UTRA having a function of connecting to the 5CG.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and the 5GC 110. The interface 114, the interface 116, the interface 118, the interface 120, and the interface 124 are interfaces that transfer CP only, UP only, or both the CP and the UP. Furthermore, the interface 114, the interface 116, the interface 118, the interface 120, and the interface 124 may not exist depending on communication systems provided by network operators.

A UE 122 is a terminal apparatus supporting the NR or both the E-UTRA and the NR.

Figure 2:
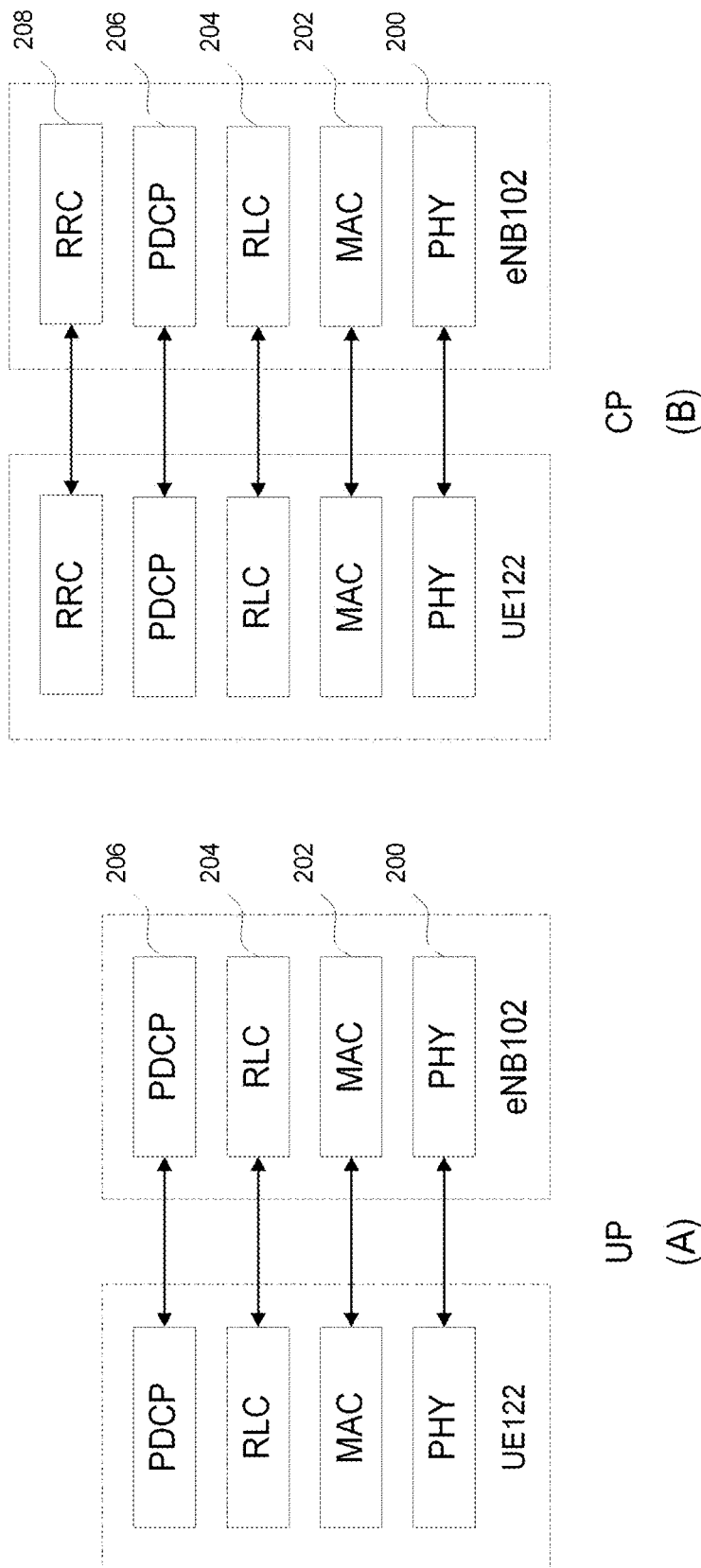
FIG. 2 is a diagram of protocol stacks of a UP and a CP of a terminal apparatus and a base station apparatus in E-UTRA according to each embodiment of the present invention.

FIG. 2 is a diagram of protocol stacks of the UP and CP of a terminal apparatus and a base station apparatus in an E-UTRA radio access layer according to each embodiment of the present invention.

FIG. 2(A) is a diagram of the protocol stack of the UP used in a case that the UE 122 communicates with the eNB 102 in the E-UTRA 100.

A physical layer (PHY) 200 is a radio physical layer for providing a transmission service to an upper layer by using a physical channel. The PHY 200 is connected with a Medium Access Control layer (MAC) 202 of an upper layer to be described below via transport channels. Data is exchanged between the MAC 202 and the PHY 200 via the transport channels. The data is transmitted and/or received via radio physical channels between the PHYs of the UE 122 and the eNB 102.

The MAC 202 is a medium access control layer that maps various logical channels to various transport channels. The MAC 202 is connected with a radio link control layer (RLC) 204 of an upper layer to be described below via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform the Discontinuous Reception and Transmission (DRX and DTX), a function of performing a random access procedure, a function of reporting transmit power information, a function of performing HARQ control, and the like (NPL 7).

The RLC 204 is a radio link control layer that divides (Segmentation) the data received from a Packet Data Convergence Protocol Layer (PDCP) 206 of an upper layer to be described below, and adjusts the data size such that a lower layer can properly perform data transmission. Furthermore, the RLC 200 also has a function of ensuring Quality of Service (QoS) required for each piece of data. In other words, the RLC 204 has a function of data retransmission control or the like (NPL 6).

The PDCP 206 is a packet data convergence protocol layer for efficiently transmitting an IP Packet, which is user data, in a radio section. The PDCP 206 may have a header compression function of compressing unnecessary control information. Furthermore, the PDCP 206 may also have a data encryption function (NPL 5).

Note that data processed in the MAC 202, the RLC 204, and the PDCP 206 are referred to as a MAC Protocol Data Unit (PDU), an RLC PDU, and a PDCP PDU, respectively. In addition, data delivered from an upper layer to the MAC 202, the RLC 204, and the PDCP 206 or data delivered therefrom to an upper layer are respectively referred to as a MAC Service Data Unit (SDU), an RLC SDU, and a PDCP SDU.

FIG. 2(B) is a diagram of the protocol stack of the CP used in a case that the UE 122 communicates with the eNB 102 in the E-UTRA 100.

In addition to the PHY 200, the MAC 202, the RLC 204, and the PDCP 206, there is a Radio Resource Control layer (RRC) 208 in the protocol stack of the CP. The RRC 208 is a radio link control layer that performs processing such as establishment, re-establishment, suspending, and resuming of suspending of RRC connection, a reconfiguration of RRC connection, for example, configurations of establishment, change, release, and the like of a Radio Bearer (RB) and a Cell Group, and in addition to performing control and the like of a logical channel, a transport channel, and a physical channel, performs configurations and the like of handover and measurement. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 208 of the eNB 102 and the UE 122. In addition, a portion of an RB including the RLC 204 and the MAC 202 (logical channel) may be referred to as an RLC bearer (NPL 4).

The functional classification of the MAC 202, the RLC 204, the PDCP 206, and the RRC 208 described above is an example, and some or all of the respective functions may not be implemented. Some or all of the functions of each layer may be included in another layer.

Note that an IP layer and a Transmission Control Protocol (TCP) layer, a User Datagram Protocol (UDP) layer, an application layer, and the like that are upper layers than the IP layer are upper layers than the PDCP layer (not illustrated). In addition, the RRC layer and a Non-Access Strarum (NAS) layer are also upper layers of an SDAP layer (not illustrated). In other words, the PDCP layer is a lower layer of the RRC layer, the NAS layer, the IP layer, and the Transmission Control Protocol (TCP) layer, the User Datagram Protocol (UDP) layer, and the application layer that are upper layers than the IP layer.

Figure 3:
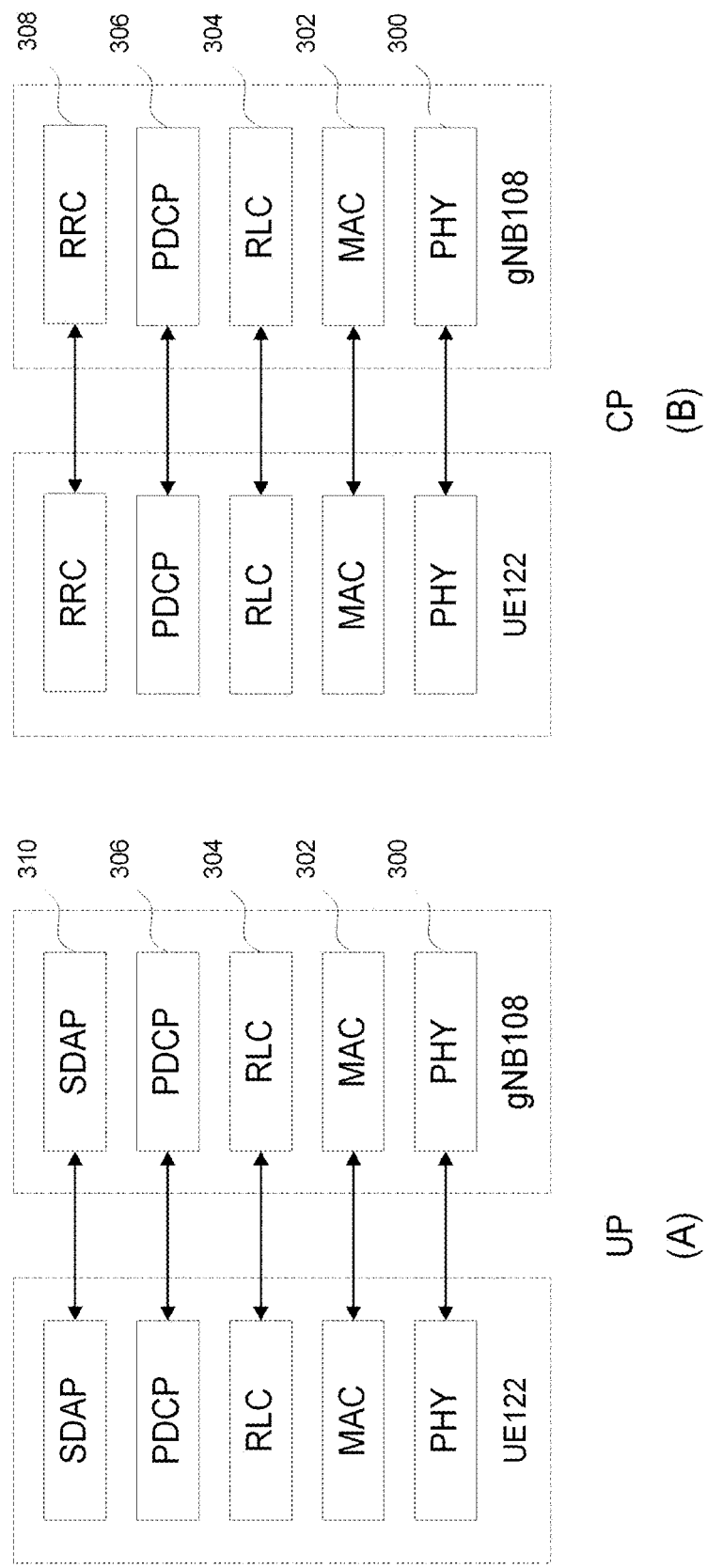
FIG. 3 is a diagram of protocol stacks of the UP and the CP of the terminal apparatus and the base station apparatus in NR according to each embodiment of the present invention.

FIG. 3 is a diagram of protocol stacks of the UP and the CP of a terminal apparatus and a base station apparatus in an NR radio access layer according to each embodiment of the present invention.

FIG. 3(A) is a diagram of the protocol stack of the UP used in a case that the UE 122 communicates with the gNB 108 in the NR 106.

A physical layer (PHY) 300 is a radio physical layer of the NR and may provide a transmission service to an upper layer by using the physical channel. The PHY 300 may be connected with the Medium Access Control layer (MAC) 302 of an upper layer to be described below via the transport channels. Data may be exchanged between the MAC 302 and the PHY 300 via the transport channels. The data may be transmitted and/or received between the PHYs of the UE 122 and the gNB 108 via the radio physical channel.

The MAC 302 is a medium access control layer that maps various logical channels to various transport channels. The MAC 302 may be connected with a Radio Link Control layer (RLC) 304 of is an upper layer to be described below via the logical channels. The classification of the logical channel depends on the type of information to be transmitted, and the logical channels may be classified into the control channels for transmitting the control information and the traffic channels for transmitting the user information. The MAC 302 has a function of controlling the PHY 300 in order to perform the Discontinuous Reception and Transmission (DRX and DTX), a function of performing the random access procedure, a function of reporting the transmit power information, a function of performing the HARQ control, and the like (NPL 13).

The RLC 304 is a radio link control layer that divides (Segmentation) the data received from a Packet Data Convergence Protocol Layer (PDCP) 206 of an upper layer to be described below, and adjusts the data size such that a lower layer can properly perform data transmission. Furthermore, the RLC 304 may also have a function of ensuring Quality of Service (QoS) required for each piece of data. In other words, the RLC 304 may have a function of data retransmission control or the like (NPL 12).

A PDCP 306 is a packet data convergence protocol layer that efficiently transmits an IP Packet, which is user data, in a radio section. The PDCP 306 may have a header compression function of compressing unnecessary control information. Furthermore, the PDCP 306 may also have a data encryption function (NPL 11).

A Service Data Adaptation Protocol (SDAP) 310 is a service data adaptation protocol layer that has a function of associating (mapping) a QoS flow of a downlink transmitted from a core network to a terminal apparatus through a base station apparatus and a DRB, mapping a QoS flow of an uplink transmitted from the terminal apparatus to the core network through the base station apparatus and the DRB, and storing mapping rule information (NPL 16). In a case that the terminal apparatus receives an SDAP SDU with QoS flow information from an upper layer, the SDAP SDU is allocated to a corresponding DRB based on the stored mapping rule between the QoS flow and the DRB. In a case that the mapping rule between the QoS flow and the DRB is not stored, the SDAP SDU may be allocated to a default radio bearer (default DRB). The QoS flow includes one or multiple service data flows (SDFs) processed using the same QoS policy (NPL 2). In addition, the SDAP may have a Reflective QoS function of mapping the QoS flow of the uplink and the DRB based on information of the QoS flow of the downlink. Furthermore, in a case that the association rule between the QoS flow and the DRB is changed, an End Marker DPU may be created and transmitted to the DRB before the change to ensure in-sequence delivery of the SDAP SDU (NPL 2 and NPL 16).

The end marker PDU is an SDAP control PDU described in NPL 16, and is used by an SDAP entity of the UE for notifying that correspondence (mapping) between a QoS flow corresponding to a QoS flow identifier included in a QoS flow identifier field of this end marker PDU and a radio bearer on which this end marker PDU is transmitted is completed.

Note that an IP layer and a Transmission Control Protocol (TCP) layer, a User Datagram Protocol (UDP) layer, an application layer, and the like that are upper layers than the IP layer are upper layers than the SDAP layer (not illustrated). In addition, the RRC layer and a Non-Access Strarum (NAS) layer are also upper layers of the SDAP layer (not illustrated). In the NAS layer, association between a service data flow and the QoS flow is performed. In other words, the SDAP layer is a lower layer of the RRC layer, the NAS layer, the IP layer, and the Transmission Control Protocol (TCP) layer, the User Datagram Protocol (UDP) layer, and the application layer that are upper layers than the IP layer.

Note that the data processed in the MAC 302, the RLC 304, the PDCP 306, and the SDAP 310 may be referred to as a MAC Protocol Data Unit (PDU), an RLC PDU, a PDCP PDU, and an SDAP PDU, respectively. In addition, the data delivered from upper layers to the MAC 202, the RLC 204, and the PDCP 206 or data delivered to upper layers therefrom may be respectively referred to as a MAC Service Data Unit (SDU), an RLC SDU, a PDCP SDU, and an SDAP SDU.

FIG. 3(B) is a diagram of the protocol stack of the CP used in a case that the UE 122 communicates with the gNB 108 in the NR 106.

In addition to the PHY 300, the MAC 302, the RLC 304, and the PDCP 306, there is a Radio Resource Control layer (RRC) 308 in the protocol stack of the CP. The RRC 308 is a radio link control layer that performs processing such as establishment, re-establishment, suspending, and resuming of suspending of RRC connection, a reconfiguration of RRC connection, for example, configurations of establishment, change, release, and the like of a Radio Bearer (RB) and a Cell Group, and in addition to performing control and the like of a logical channel, a transport channel, and a physical channel, performs configurations and the like of handover and measurement. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 308 of the gNB 108 and the UE 122. In addition, a portion of an RB including the RLC 304 and the MAC 302 (logical channel) may be referred to as an RLC bearer (NPL 10).

The functional classification of the MAC 302, the RLC 304, the PDCP 306, the SDAP 310, and the RRC 308 described above is an example, and some or all of the functions may not be implemented. Furthermore, some or all of the functions of each layer may be included in another layer.

Note that in each embodiment of the present invention, hereinafter, in order to distinguish an E-UTRA protocol and an NR protocol from each other, the MAC 202, the RLC 204, the PDCP 206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. Furthermore, the MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2. In addition, in the E-UTRA 100, even in a case that the UE 122 communicates with the eNB 102, the NR PDCP may be used as a PDCP.

Figure 4:
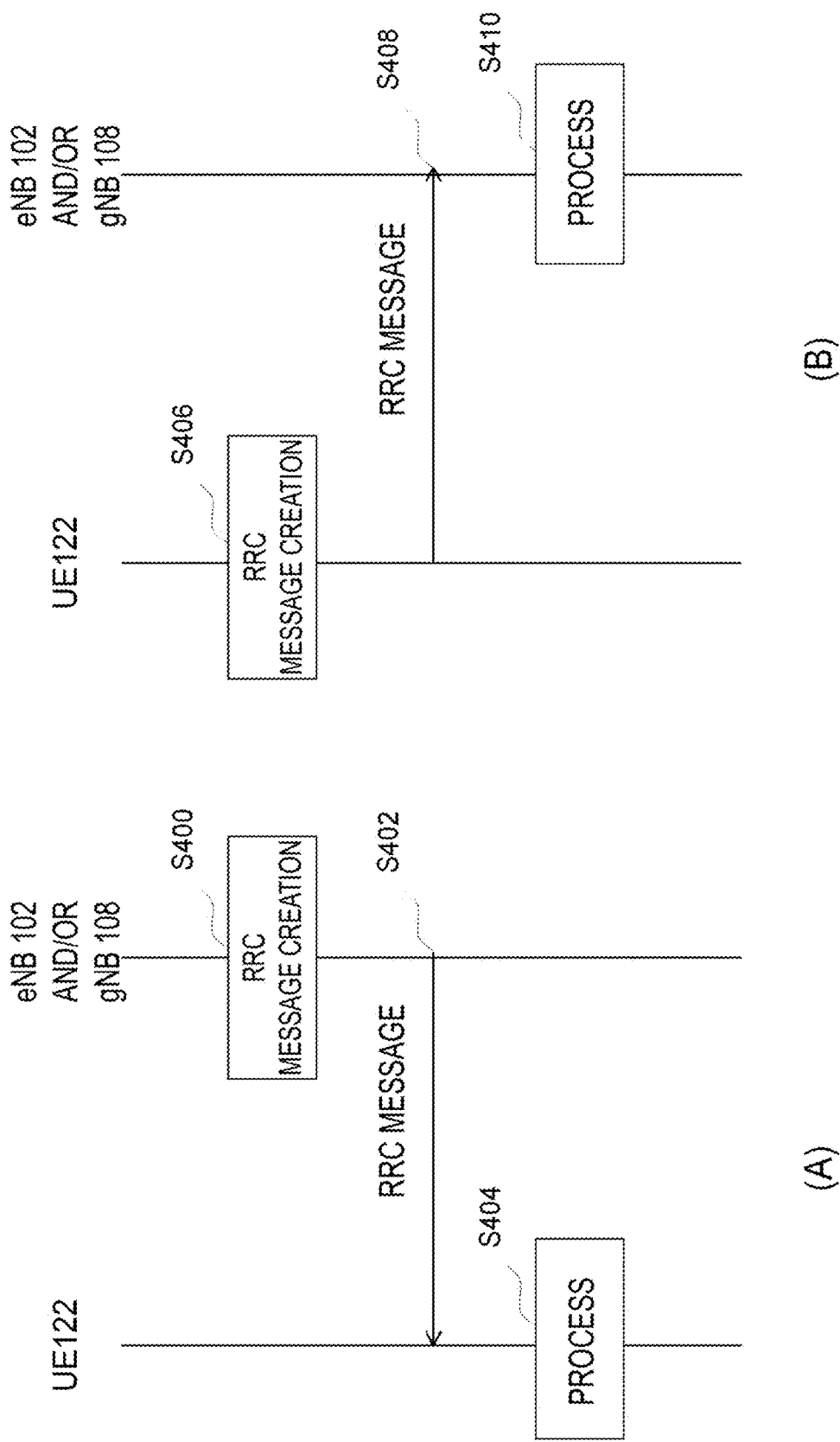
FIG. 4 is a diagram illustrating an example of a flow of a procedure for various configurations in an RRC 208 and/or an RRC 308 according to each embodiment of the present invention.

FIG. 4 is a diagram illustrating an example of a flow of a procedure for various configurations in the RRC 208 and/or the RRC 308 according to each embodiment of the present invention. FIG. 4(A) is an example of a flow in a case that an RRC message is transmitted from a base station apparatus (eNB 102 and/or gNB 108) to a terminal apparatus (UE 122), and FIG. 4(B) is an example of a flow in a case that an RRC message is transmitted from the terminal apparatus (UE 122) to the base station apparatus (eNB 102 and/or gNB 108).

In FIG. 4(A), the base station apparatus creates an RRC message (step S400). The creation of the RRC message in the base station apparatus may be performed in a case that the base station apparatus distributes broadcast information (System Information (SI)) or paging information, or may be performed in a case that the base station apparatus determines that it is necessary to cause a specific terminal apparatus to perform processing, for example, in a case of a configuration related to security, a reconfiguration of RRC connection (radio bearer processing (establishment, change, release, or the like), cell group processing (establishment, addition, change, release, or the like), a measurement configuration, a handover configuration, or the like), release of an RRC connection state, or the like. Furthermore, the creation may be performed for responding to an RRC message received from a specific terminal apparatus in step S408 described later, or may be performed at a time other than this. The RRC message includes parameters for various information notifications and configurations. In the specifications for RRC, such as NPL 4 or NPL 10, these parameters are referred to as fields and/or information elements, and are described using a description form called Abstract Syntax Notation One (ASN.1).

In FIG. 4(A), next, the base station apparatus transmits the created RRC message to the terminal apparatus (step S402). Next, the terminal apparatus performs processing in a case that processing such as a configuration is necessary in accordance with the received RRC message described above (step S404).

In FIG. 4(B), the terminal apparatus creates an RRC message (step S406). The creation of the RRC message in the terminal apparatus may be performed in a case that a request for the base station apparatus occurs, for example, in a case of establishment of RRC connection by a request from an upper layer or the like, radio link failure or random access failure, re-establishment of RRC connection by detecting radio synchronization loss or the like, resuming of RRC connection suspending by a request from an upper layer or a Radio Access Network (RAN) paging response, or the like, may be performed for responding to the RRC message received from the base station apparatus in step S402 described above, or may be performed at a time other than this.

In FIG. 4(B), next, the terminal apparatus transmits the created RRC message to the base station apparatus (step S408). Next, the base station apparatus performs processing in a case that processing is necessary in accordance with the received RRC message described above (step S410).

Note that the creation of the RRC message is not limited to the example described above, and the message may be created for other purposes, as described in NPL 4, NPL 10, and the like.

For example, the RRC message may be used for a configuration related to Dual Connectivity (DC) or the Multi-RAT Dual Connectivity (MR-DC) described in NPL 8.

The Dual Connectivity (DC) may be a technology for performing data communication by using both radio resources of cell groups respectively configured by two base station apparatuses (nodes), that is, a Master Cell Group (MCG) configured by a Master Node (MN) and a Secondary Cell Group (SCG) configured by a Secondary Node (SN). Furthermore, the MR-DC described in NPL 8 may be a technology in which cells of Radio Access Technologies (RATs) of both E-UTRA and NR are grouped into a cell group for each RAT and allocated to the UE, and data communication is performed using both radio resources of the MCG and the SCG. In the MR-DC, the master node may be a base station having primary RRC functions related to the MR-DC, for example, functions such as addition of the secondary node, establishment, change, and release of the RB, addition, change, and release of the MCG, handover, and the like, and the secondary node may be a base station having some RRC functions, for example, change and release of the SCG, and the like.

In the MR-DC described in NPL 8, the RRC of the RAT on the master node side may be used to configure both the MCG and the SCG. For example, in E-UTRA-NR Dual Connectivity (EN-DC), which is MR-DC in a case that the core network is the EPC 104 and the master node is the eNB 102 (also referred to as an extension type eNB 102), and NG-RAN E-UTRA-NR Dual Connectivity (NGEN-DC), which is MR-DC in a case that the core network is the 5GC 110 and the master node is the eNB 102, an RRC message of E-UTRA described in NPL 4 may be transmitted and/or received between the eNB 102 and the UE 122. In this case, the RRC message may include not only LTE (E-UTRA) configuration information but also NR configuration information described in NPL 10. Furthermore, the RRC message transmitted from the eNB 102 to the UE 122 may also be transmitted from the eNB 102 to the UE 122 through the gNB 108. Furthermore, the configuration of this RRC message may be used for an E-UTRA/5GC (option 5 described in NPL 17) which is non-MR-DC and in which the eNB 102 (extension type eNB) uses 5GC as the core network.

Furthermore, conversely, in the MR-DC described in NPL 8, in NR-E-UTRA Dual Connectivity (NE-DC), which is MR-DC in a case that the core network is the 5GC 110 and the master node is the gNB 108, an RRC message of NR described in NPL 10 may be transmitted and/or received between the gNB 102 and the UE 122. In this case, the RRC message may include not only NR configuration information but also LTE (E-UTRA) configuration information described in NPL 4. Furthermore, the RRC message transmitted from the gNB 108 to the UE 122 may also be transmitted from the gNB 108 to the UE 122 through the eNB 102.

Embodiment 1

Embodiment 1 of the present invention will be described with reference to FIG. 1 to FIG. 9. In each embodiment of the present invention, in the terminal apparatus in which the MR-DC described in NPL 8 is configured, in a case that it is necessary to release part or all of configurations on the SCG side, an example of a method of triggering release on the SCG side, to the SCG side from the MCG side of the terminal apparatus is described. Embodiment 1 of the present invention is described particularly by assuming NE-DC, which is MR-DC in which the MCG side is the NR and the SCG side is E-UTRA, but may be adopted to another MR-DC or DC having the same RAT (E-UTRA, NR, and the like) as the MCG and the SCG.

Figure 5:
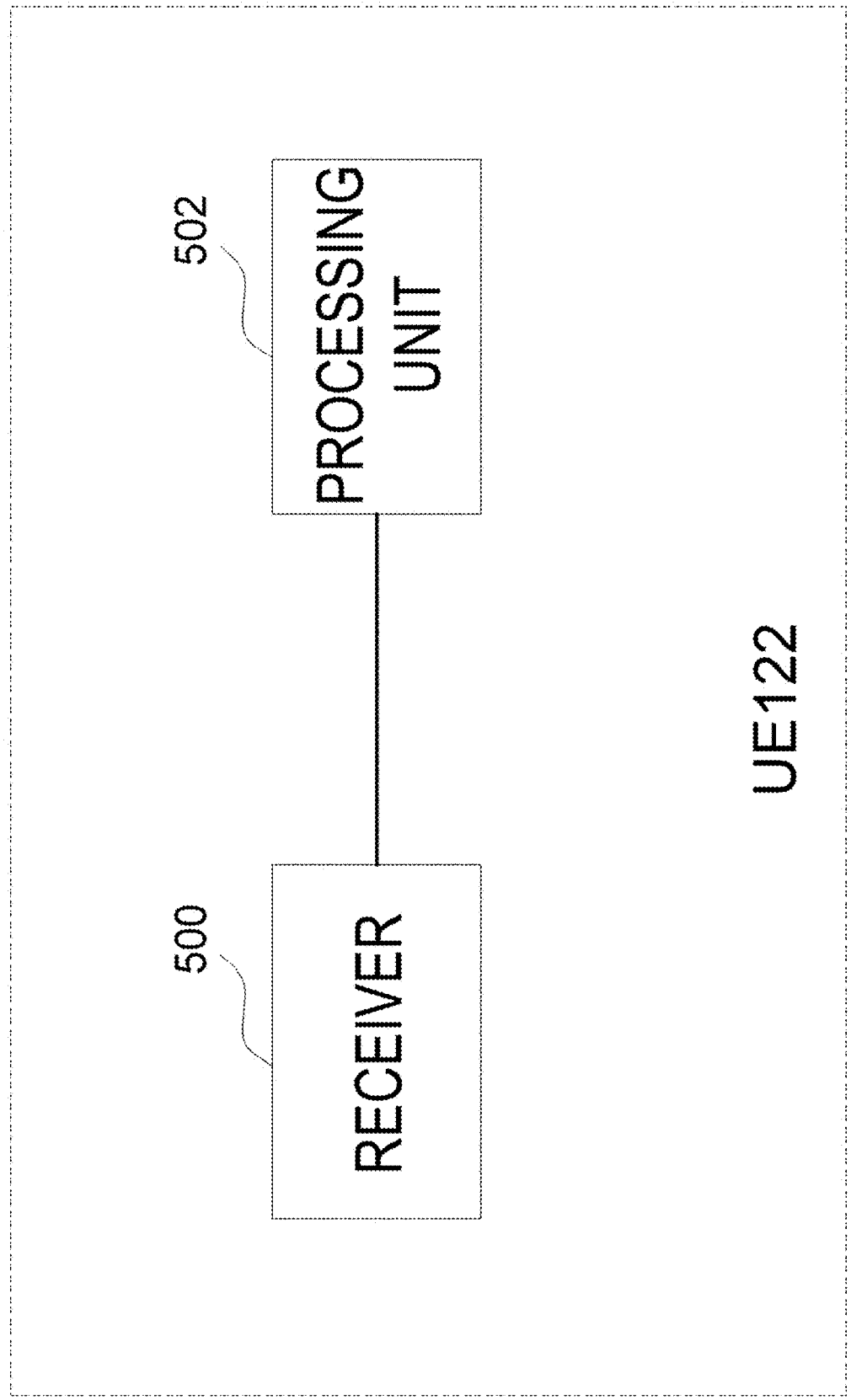
FIG. 5 is a block diagram illustrating a configuration of a terminal apparatus according to each embodiment of the present invention.

FIG. 5 is a block diagram illustrating a configuration of the terminal apparatus (UE 122) according to each embodiment of the present invention. Note that FIG. 5 illustrates only the main components closely related to the embodiment of the present invention in order to avoid complexity of description.

The UE 122 illustrated in FIG. 5 includes a receiver 500 configured to receive an RRC message and the like from the eNB 102 and/or the gNB 108, and a processing unit 502 configured to perform processing in accordance with configuration information, such as various Information Elements (IEs) and/or various fields and/or various conditions included in the received message. Furthermore, the processing unit 502 may perform processing to trigger a request or an indication from the MCG side to the SCG side in the inside of the UE 122 in which the DC is configured. For example, in the inside of the UE 122 in which the MR-DC is configured, a process may be performed in which a request or an indication, for example, from the E-UTRA side to the NR side in the EN-DC and the NGEN-DC described in NPL 8, and for example, from the NR side to the E-UTRA side in the NE-DC described in NPL 8, is triggered. Furthermore, the processing unit 502 may perform processing triggered from the MCG side, on the SCG side inside the UE 122 in which the DC is configured. For example, processing triggered from the E-UTRA side may be performed on the NR side in the EN-DC and the NGEN-DC described in NPL 8, and, for example, processing triggered from the NR side may be performed on the E-UTRA side in the NE-DC described in NPL 8. Note that the expression "MR-DC is configured" may be expressed as "the MR-DC is being processed", or may be expressed as "the MR-DC is being operated". Note that the NR side and the E-UTRA side may be NR RRC and E-UTRA RRC, respectively, here.

Figure 6:
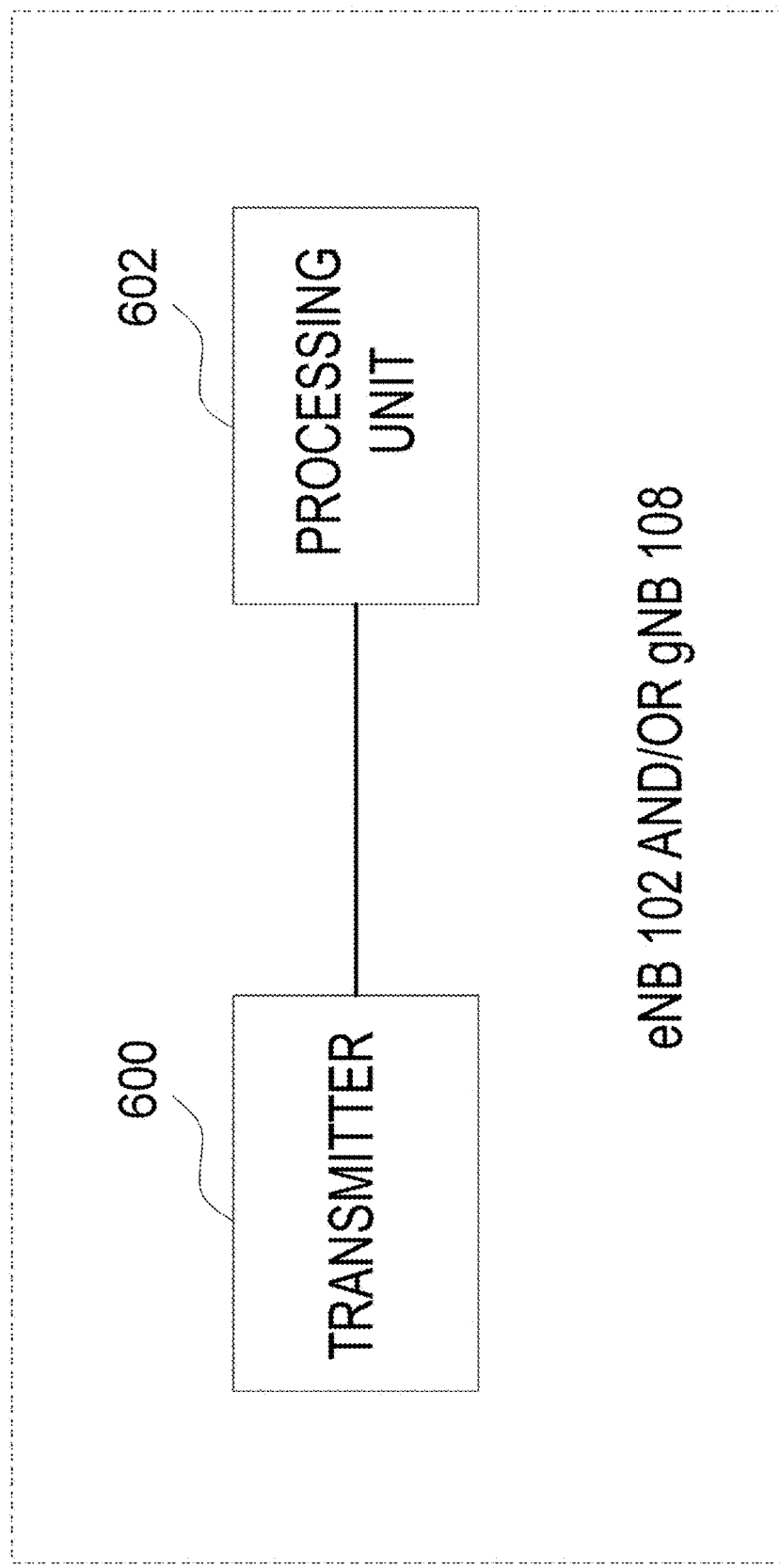
FIG. 6 is a block diagram illustrating a configuration of the base station apparatus according to each embodiment of the present invention.

FIG. 6 is a block diagram illustrating a configuration of the base station apparatus (eNB 102 and/or gNB 108) according to each embodiment of the present invention. Note that FIG. 6 illustrates only the main components closely related to the embodiment of the present invention in order to avoid complexity of description.

The eNB 102 and/or the gNB 108 illustrated in FIG. 6 includes a transmitter 600 configured to transmit an RRC message and the like to the UE 122, and a processing unit 602 configured to cause the processing unit 502 of the UE 122 to perform processing by creating the RRC message including configuration information, such as various Information Elements (IEs) and/or various fields and/or various conditions and transmitting the message to the UE 122.

An example of a processing method of the UE 122 according to Embodiment 1 of the present invention will be described with reference to FIG. 7.

The processing unit 502 of the UE 122 determines whether or not release of an E-UTRA Secondary Cell Group (SCG) in the MR-DC is triggered from the MCG side to the E-UTRA side, which is the SCG side, in the inside of the UE 122 (step S700). Note that in step S700, the MR-DC may be the NE-DC. Furthermore, the release of the E-UTRA secondary cell group in the MR-DC may be referred to as release of the NE-DC. Furthermore, the E-UTRA secondary cell group may simply be referred to as a secondary cell group. Furthermore, the MCG may be the NR.

Next, the processing unit 502 of the UE 122 releases, based on the fact that the release of the E-UTRA secondary cell group in the MR-DC is triggered from the MCG side to the E-UTRA side in the inside of the UE 122, an RLC entity for each RLC bearer configured in the E-UTRA secondary cell group in the MR-DC. The release of the RLC entity described above may be performed after re-establishment of the RLC entity (step S702). Note that with respect to "for each RLC bearer" described above, "for each logical channel or each logical channel identifier" may be used for rephrasing, or may be added. Furthermore, the MCG may be the NR.

The processing unit 502 of the UE 122 may perform, in addition to the processing in step S702 described above, based on the fact that the release of the E-UTRA secondary cell group in the MR-DC is triggered from the MCG side to the E-UTRA side in the inside of the UE 122, release of the measurement configuration and/or release of the MAC of the secondary cell group in a case that the MAC of the secondary cell group is present and/or release of the secondary cell group and/or stop of a timer for determining radio link failure of the secondary cell group and/or stop of a timer for determining change failure of the secondary cell group (step S704). Furthermore, the MCG may be the NR.

Note that in the above-described triggering of the release of the E-UTRA secondary cell group in the MR-DC from the MCG side to the E-UTRA side in the inside of the UE 122, for example, on the NR side, in a case of requesting RRC connection re-establishment (RRC Re-establishment), it is determined whether or not the MR-DC is configured, and the triggering may be performed based on the fact that the MR-DC is configured (not illustrated). Note that the expression "MR-DC is configured" may be expressed as "the MR-DC is being processed", or may be expressed as "the MR-DC is being operated". Furthermore, the expression "it is determined whether or not the MR-DC is configured" described above may be expressed as "it is determined whether or not the NE-DC is configured". Furthermore, the expression "the triggering may be performed based on the fact that the MR-DC is configured" described above may be expressed as "the triggering may be performed based on the fact that the NE-DC is configured".

Furthermore, in the above-described triggering of the release of the E-UTRA secondary cell group in the MR-DC from the MCG side to the E-UTRA side in the inside of the UE 122, for example, on the NR side, in a case of requesting resuming of RRC connection suspending, it is determined whether or not the MR-DC has been configured during the RRC connection suspending, and the triggering may be performed based on the fact that the MR-DC has been configured (not illustrated). Note that the expression "MR-DC has been configured" may be expressed as "the MR-DC has been processed", or may be expressed as "the MR-DC has been operated". Furthermore, the expression "it is determined whether or not the MR-DC has been configured" described above may be expressed as "it is determined whether or not the NE-DC has been configured". Furthermore, the expression "the triggering may be performed based on the fact that the MR-DC has been configured" described above may be expressed as "the triggering may be performed based on the fact that the NE-DC has been configured".

Figure 8:
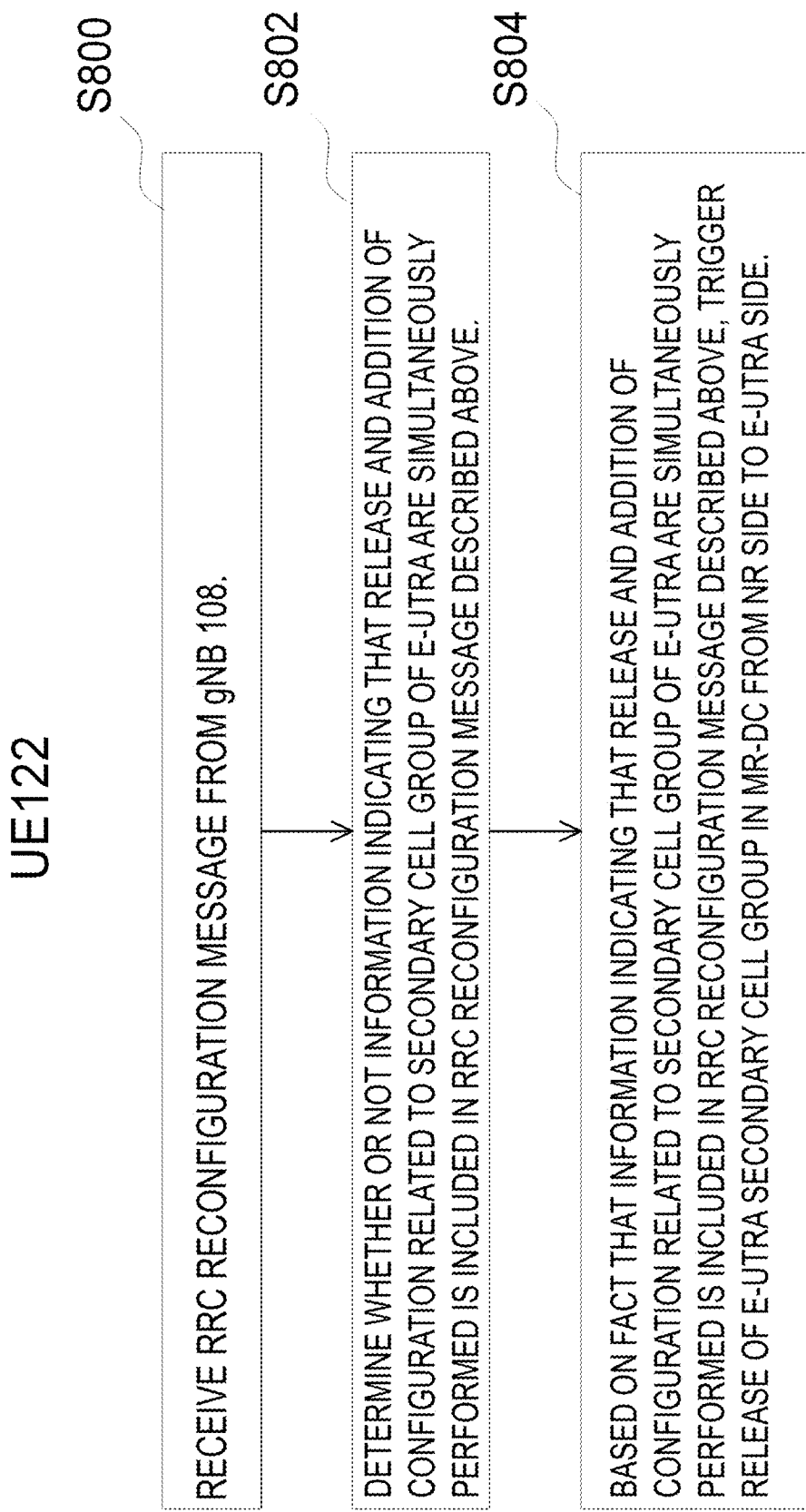
FIG. 8 illustrates an example in which release of E-UTRA secondary cell group in MR-DC is triggered from NR side to E-UTRA side in the inside of the UE 122 according to Embodiment 1 of the present invention.

Furthermore, in the above-described triggering of the release of the E-UTRA secondary cell group in the MR-DC from the NR side to the E-UTRA side in the inside of the UE 122, the triggering may be performed based on another event. FIG. 8 illustrates an example in which the release of the E-UTRA secondary cell group in the MR-DC is triggered from the NR side to the E-UTRA side in the inside of the UE 122 described above, according to Embodiment 1 of the present invention.

The processing unit 602 of the gNB 108 creates an RRC reconfiguration message, which is an RRC message for causing the UE 122 to perform RRC connection reconfiguration processing, and transmits the RRC reconfiguration message to the UE 122 from the transmitter 600 (not illustrated). The receiver 500 of the UE 122 receives the RRC reconfiguration message from the gNB 108 (step S800). Note that the UE 122 may receive the RRC reconfiguration message from the eNB 102.

Next, the processing unit 502 of the UE 122 determines whether or not information indicating that release and addition of a configuration related to the SCG of the E-UTRA are simultaneously performed is included in the RRC reconfiguration message received in step S800 (step S804). Note that the expression "determines whether or not information indicating that release and addition of a configuration related to the SCG of the E-UTRA are simultaneously performed is included" described above may be rephrased as "determines whether information indicating that release and addition of a configuration related to the SCG of the E-UTRA are simultaneously performed is true or false". Additionally, the above-described true/false may also be replaced with another description having opposite meanings, such as enable/disable, on/off, 1/0, or the like. Furthermore, the expression "release and addition of a configuration related to the SCG of the E-UTRA are simultaneously performed" described above may be rephrased as "release and addition of all configurations related to the SCG of the E-UTRA are simultaneously performed". Furthermore, the "configuration related to the SCG of the E-UTRA" and the "all configurations related to the SCG of the E-UTRA" described above may be the configuration(s) configured by the E-UTRA, or may be the configuration(s) configured by the RRC message of the E-UTRA.

Next, the processing unit 502 of the UE 122 triggers, based on the fact that information indicating that release and addition of a configuration related to the secondary cell group of the E-UTRA are simultaneously performed is included in the RRC reconfiguration message described above, release of the E-UTRA secondary cell group in the MR-DC from the NR side to the E-UTRA side (step S804). Note that the MR-DC in step S804 may be the NE-DC. Note that the expression "based on the fact that information indicating that release and addition of a configuration related to the SCG of the E-UTRA are simultaneously performed is included" described above may be rephrased as "based on the fact that information indicating that release and addition of a configuration related to the SCG of the E-UTRA are simultaneously performed is true". Furthermore, the above-described true may also be replaced with another expression, such as enable, on, 1, or the like, which means that this information is valid. Furthermore, the "information indicating that release and addition of a configuration related to the SCG of the E-UTRA are simultaneously performed" described above may be included in a case that a full configuration is necessary on the E-UTRA SCG side, or may mean that this information is valid by being configured to true, enable, on, 1, or the like.

Note that the example of the processing illustrated in FIG. 8 may be used not only for release of the E-UTRA secondary cell group in the MR-DC but also for release of the NR secondary cell group in NR-DC. In a case that the release of the NR secondary cell group in the NR-DC is performed, the expression "a configuration related to the SCG of the E-UTRA" described above may be rephrased as "a configuration related to the SCG of the NR".

FIG. 9 illustrates an example of an ASN.1 description of information indicating that release and addition of a configuration related to the secondary cell group are simultaneously performed included in an RRC reconfiguration message, in FIG. 8, according to Embodiment 1 of the present invention. In the example in FIG. 9, a description of RRCReconfiguration-IEs which indicates an information element of the RRC reconfiguration message includes RadioBearerConfig which is an information element indicating a radio bearer configuration, and the information element indicating the configuration information of the radio bearer further includes nedc-ReleaseAndAdd-r15 which is a field of information indicating that release and addition of a configuration related to the secondary cell group are simultaneously performed described above. The names of the information element and field indicating each piece of information are not limited to those described above.

Furthermore, in Embodiment 1 of the present invention, processing based on the fact that release of the E-UTRA secondary cell group in the MR-DC is triggered from the MCG side to the E-UTRA side in the inside of the UE 122 may be referred to as NE-DC release, or may be referred to as E-UTRA MR-DC release, MR-DC E-UTRA SCG release, or the like. Alternatively, another name may be used.

As described above, in Embodiment 1 of the present invention, based on the fact that release of the E-UTRA secondary cell group in the MR-DC is triggered from the NR side, which is the MCG, to the E-UTRA side in the inside of the UE 122, it is possible to perform release processing of the E-UTRA secondary cell group. That is, the terminal apparatus can efficiently perform communication by reducing complexity of protocol processing of the MR-DC.

Embodiment 2

Embodiment 2 of the present invention will be described with reference to FIG. 1 to FIG. 6 and FIG. 10 to FIG. 12. Embodiment 2 of the present invention is described particularly by assuming EN-DC and/or NGEN-DC, which is MR-DC in which the MCG side is the E-UTRA and the SCG side is the NR, and/or NR-DC in which both the MCG side and the SCG side are the NR, but may be adopted to another MR-DC or another DC having the same RAT as the MCG and the SCG.

FIG. 5 is a block diagram illustrating a configuration of the terminal apparatus (UE 122) according to each embodiment of the present invention. Note that FIG. 5 illustrates only the main components closely related to the embodiment of the present invention in order to avoid complexity of description.

The UE 122 illustrated in FIG. 5 includes the receiver 500 configured to receive an RRC message and the like from the eNB 102 and/or the gNB 108, and the processing unit 502 configured to perform processing in accordance with configuration information, such as various Information Elements (IEs) and/or various fields and/or various conditions included in the received message. Furthermore, the processing unit 502 may perform processing to trigger a request or an indication from the MCG side to the SCG side in the inside of the UE 122 in which the DC is configured. For example, in the inside of the UE 122 in which the MR-DC is configured, a process may be performed in which a request or an indication, for example, from the E-UTRA side to the NR side in the EN-DC and the NGEN-DC described in NPL 8, and for example, from the NR side to the E-UTRA side in the NE-DC described in NPL 8, is triggered. Furthermore, the processing unit 502 may perform processing triggered from the MCG side, on the SCG side inside the UE 122 in which the DC is configured. For example, processing triggered from the E-UTRA side may be performed on the NR side in the EN-DC and the NGEN-DC described in NPL 8, and, for example, processing triggered from the NR side may be performed on the E-UTRA side in the NE-DC described in NPL 8. Note that the expression "MR-DC is configured" may be expressed as "the MR-DC is being processed", or may be expressed as "the MR-DC is being operated". Note that the NR side and the E-UTRA side may be NR RRC and E-UTRA RRC, respectively, here.

FIG. 6 is a block diagram illustrating a configuration of the base station apparatus (eNB 102 and/or gNB 108) according to each embodiment of the present invention. Note that FIG. 6 illustrates only the main components closely related to the embodiment of the present invention in order to avoid complexity of description.

The eNB 102 and/or the gNB 108 illustrated in FIG. 6 includes the transmitter 600 configured to transmit an RRC message and the like to the UE 122, and the processing unit 602 configured to cause the processing unit 502 of the UE 122 to perform processing by creating the RRC message including configuration information, such as various Information Elements (IEs) and/or various fields and/or various conditions and transmitting the message to the UE 122.

Figure 10:
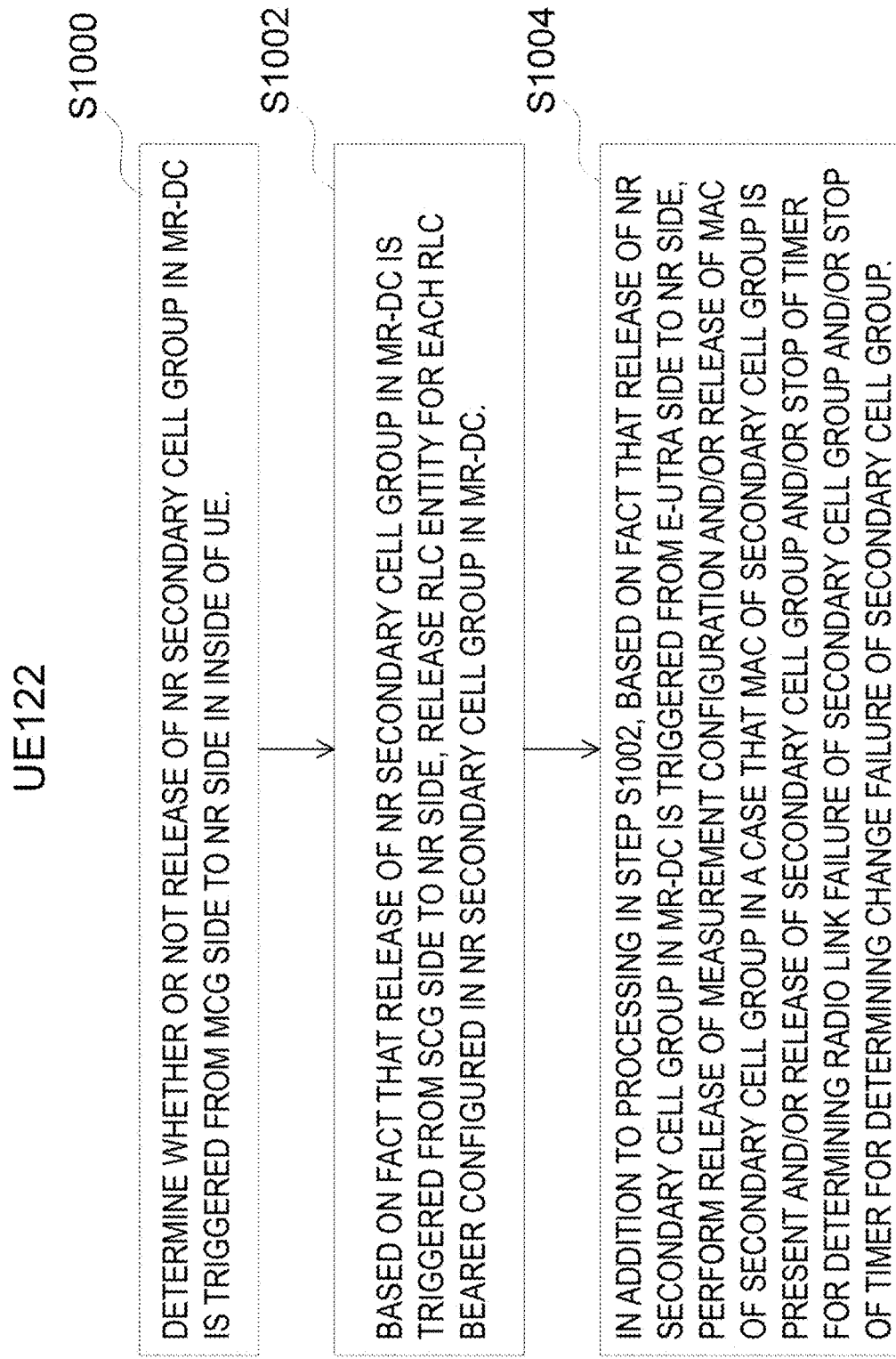
FIG. 10 illustrates an example of a processing method of a UE 122 according to Embodiment 2 of the present invention.

An example of a processing method of the UE 122 according to Embodiment 2 of the present invention will be described with reference to FIG. 10.

The processing unit 502 of the UE 122 determines whether or not release of an NR Secondary Cell Group (SCG) in the MR-DC and/or the NR-DC (DC which takes the NR as RAT in both the MCG and the SCG) is triggered from the MCG side to the NR side, which is the SCG side, in the inside of the UE 122 (step S1000). Note that in step S1000, the MR-DC may be the EN-DC and/or NGEN-DC. Furthermore, the release of the NR secondary cell group in the MR-DC may be referred to as release of the EN-DC, may be referred to as release of the NGEN-DC, or may be referred to as EN-DC or NGEN-DC. Furthermore, the NR secondary cell group may simply be referred to as a secondary cell group. Furthermore, the MCG may be the E-UTRA, or may be the NR.

Next, the processing unit 502 of the UE 122 releases, based on the fact that the release of the NR secondary cell group in the MR-DC and/or the NR-DC is triggered from the MCG side to the NR side in the inside of the UE 122, an RLC entity for each RLC bearer configured in the NR secondary cell group in the MR-DC. (step S1002). Note that with respect to "for each RLC bearer" described above, "for each logical channel or each logical channel identifier" may be used for rephrasing, or may be added. Furthermore, the MCG may be the E-UTRA, or may be the NR.

The processing unit 502 of the UE 122 may perform, in addition to the processing in step S1002 described above, based on the fact that the release of the NR secondary cell group in the MR-DC and/or the NR-DC is triggered from the MCG side to the NR side in the inside of the UE 122, release of the measurement configuration and/or release of the MAC of the secondary cell group in a case that the MAC of the secondary cell group is present and/or release of the secondary cell group and/or stop of a timer for determining radio link failure of the secondary cell group and/or stop of a timer for determining change failure of the secondary cell group (step S1004).

Figure 11:
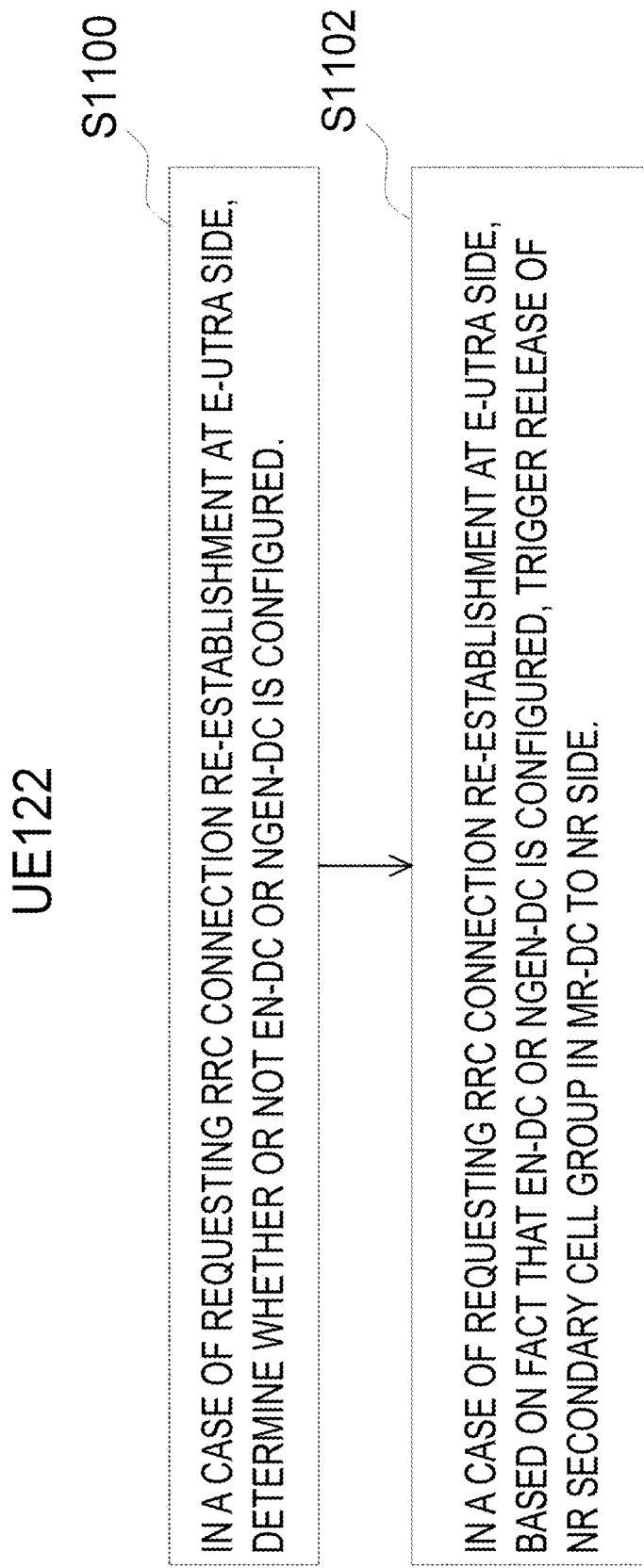
FIG. 11 illustrates an example in which release of NR secondary cell group in MR-DC is triggered from E-UTRA side to NR side in the inside of the UE 122, according to Embodiment 2 of the present invention.

FIG. 11 illustrates an example in which release of the NR secondary cell group in MR-DC is triggered from an E-UTRA side to an NR side in the inside of the UE 122, according to Embodiment 2 of the present invention.

In a case of requesting RRC Connection Re-establishment on the E-UTRA side, the processing unit 502 of the UE 122 determines whether or not the MR-DC is configured (step S1100), and based on the fact that the MR-DC is configured, release of the NR secondary cell group in the MR-DC may be triggered (step S1102). Note that the expression "MR-DC is configured" may be expressed as "the MR-DC is being processed", or may be expressed as "the MR-DC is being operated". Furthermore, the expression "determines whether or not the MR-DC is configured" described above may be expressed as "determines whether or not the EN-DC or the NGEN-DC is configured". Furthermore, the expression "based on the fact that the MR-DC is configured, release of the NR secondary cell group in the MR-DC may be triggered" described above may be expressed as "based on the fact that the EN-DC or the NGEN-DC is configured, release of the NR secondary cell group in the MR-DC may be triggered".

Figure 12:
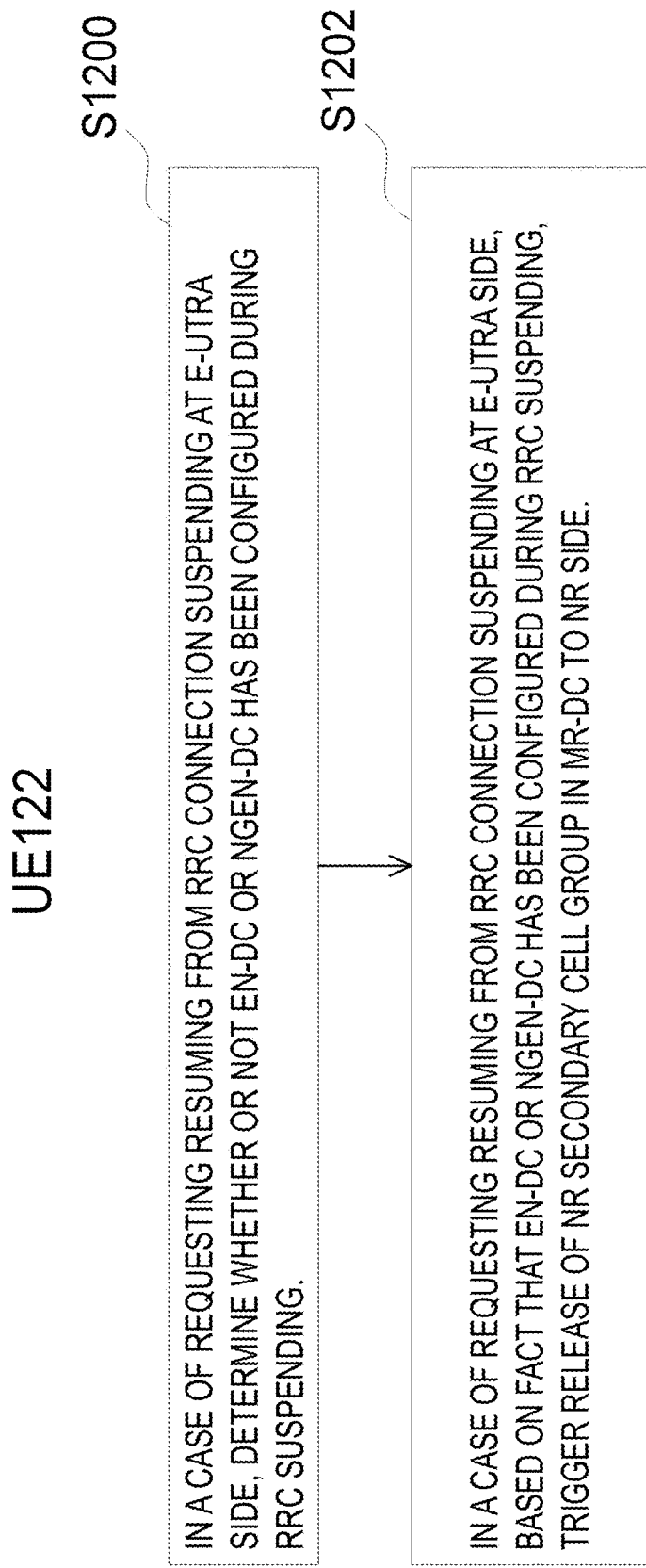
FIG. 12 illustrates another example in which release of NR secondary cell group in MR-DC is triggered from E-UTRA side to NR side in the inside of the UE 122, according to Embodiment 2 of the present invention.

FIG. 12 illustrates another example in which release of the NR secondary cell group in MR-DC is triggered from then E-UTRA side to then NR side in the inside of the UE 122, according to Embodiment 2 of the present invention.

In a case of requesting resuming of RRC connection suspending on the E-UTRA side, the processing unit 502 of the UE 122 determines whether or not the MR-DC has been configured during RRC connection suspending (step S1200), and based on the fact that the MR-DC has been configured, release of the NR secondary cell group in the MR-DC may be triggered (step S1202). Note that the expression "MR-DC has been configured" may be expressed as "the MR-DC has been processed", or may be expressed as "the MR-DC has been operated". Furthermore, the expression "determines whether or not the MR-DC has been configured" described above may be expressed as "determines whether or not the EN-DC or the NGEN-DC has been configured". Furthermore, the expression "based on the fact that the MR-DC has been configured, release of the NR secondary cell group in the MR-DC may be triggered" described above may be expressed as "based on the fact that the EN-DC or the NGEN-DC has been configured, release of the NR secondary cell group in the MR-DC may be triggered".

Furthermore, in the above-described triggering of the release of the NR secondary cell group in the NR-DC from the MCG side to the NR side in the inside of the UE 122, for example, on the NR side, in a case of requesting RRC connection re-establishment (RRC Re-establishment), it is determined whether or not the NR-DC is configured, and the triggering may be performed based on the fact that the NR-DC is configured (not illustrated). Note that the expression "NR-DC is configured" may be expressed as "the NR-DC is being processed", or may be expressed as "the NR-DC is being operated".

Furthermore, in the above-described triggering of the release of the NR secondary cell group in the NR-DC from the MCG side to the NR side in the inside of the UE 122, for example, on the NR side, in a case of requesting resuming of RRC connection suspending, it is determined whether or not the NR-DC has been configured during the RRC connection suspending, and the triggering may be performed based on the fact that the NR-DC has been configured (not illustrated). Note that the expression "NR-DC has been configured" may be expressed as "the NR-DC has been processed", or may be expressed as "the NR-DC has been operated".

Furthermore, in the above-described triggering of the release of the NR secondary cell group in the MR-DC and/or the NR-DC from the MCG side to the NR side in the inside of the UE 122, the triggering may be performed based on another event. For example, in the E-UTRA, by receiving an RRC connection reconfiguration message including information indicating that release and addition of all configurations related to the secondary cell group of the NR are simultaneously performed, the triggering may be performed. Note that the expression "based on the fact that information indicating that release and addition of all configurations related to the secondary cell group of the NR are simultaneously performed is included" described above may be rephrased as "based on the fact that information indicating that release and addition of all configurations related to the secondary cell group of the NR are simultaneously performed is true".

Furthermore, in Embodiment 2 of the present invention, processing based on the fact that release of the E-UTRA secondary cell group in the MR-DC and/or the NR-DC is triggered from the MCG side to the NR side in the inside of the UE 122 may be referred to as EN-DC release, or may be referred to as NGEN-DC release, or may be referred to as EN-DC or NGEN-DC release. Furthermore, the processing may be referred to as NR MR-DC release, MR-DC NR SCG release, NR SCG release, SCG release, and the like. Alternatively, another name may be used.

As described above, in Embodiment 2 of the present invention, based on the fact that release of the NR secondary cell group in the MR-DC and/or the NR-DC is triggered from the MCG side to the NR side in the inside of the UE 122, it is possible to perform release processing of the NR secondary cell group. That is, the terminal apparatus can efficiently perform communication by reducing complexity of protocol processing of the MR-DC.

Note that the terminal apparatus and the method according to each embodiment of the present invention can be described as follows, for example.

That is, a terminal apparatus includes: a processing unit configured to determine, in a case that the terminal apparatus requests re-establishment of an RRC connection, whether or not the terminal apparatus is configured with EN-DC or NGEN-DC, and trigger, in a case that the terminal apparatus is configured with EN-DC or NGEN-DC, release of an NR secondary cell group.

Furthermore, a terminal apparatus includes: a processing unit configured to determine, in a case that the terminal apparatus requests resumption of an RRC connection suspended, whether or not the terminal apparatus has been configured with EN-DC or NGEN-DC during the suspend of the RRC connection, and trigger, in a case that the terminal apparatus has been configured with EN-DC or NGEN-DC, release of an NR secondary cell group.

Furthermore, a method of a terminal apparatus, the method includes the steps of: determining, in a case that the terminal apparatus requests re-establishment of an RRC connection, whether or not the terminal apparatus is configured with EN-DC or NGEN-DC; and triggering, in a case that the terminal apparatus is configured with EN-DC or NGEN-DC, release of an NR secondary cell group.

Furthermore, a method of a terminal apparatus, the method includes the steps of: determining, in a case that the terminal apparatus requests resumption of an RRC connection suspended, whether or not the terminal apparatus has been configured with EN-DC or NGEN-DC during the suspend of the RRC connection; and triggering, in a case that the terminal apparatus has been configured with EN-DC or NGEN-DC, release of an NR secondary cell group.

A program operating on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

The invention claimed is:
1. A terminal apparatus comprising:
processing circuitry configured to:
determine whether or not NG-RAN E-UTRA-NR Dual Connectivity (NGEN-DC) is configured to the terminal apparatus in a case of requesting RRC connection re-establishment to a base station apparatus on an E-UTRA side,
trigger a release of an NR secondary cell group in Multi-RAT Dual Connectivity (MR-DC) in a case that NGEN-DC is configured to the terminal apparatus, and
release an RLC entity for each RLC bearer configured in the NR secondary cell group in the MR-DC in a case that the release of the NR secondary cell group in the MR-DC is triggered.

2. A base station apparatus comprising:
receiving circuitry configured to:
receive a request for RRC connection re-establishment from an E-UTRA side of a terminal apparatus, wherein in a case of receiving the request for RRC connection re-establishment,
a release of an NR secondary cell group in Multi-RAT Dual Connectivity (MR-DC) is triggered in a case that NGEN-DC (NG-RAN E-UTRA-NR Dual Connectivity) is configured to the terminal apparatus, and
an RLC entity for each RLC bearer configured in the NR secondary cell group in the MR-DC is released in a case that the release of the NR secondary cell group in the MR-DC is triggered.

3. A method of a terminal apparatus, the method comprising:
determining whether or not NG-RAN E-UTRA-NR Dual Connectivity (NGEN-DC) is configured to the terminal apparatus in a case of requesting RRC connection re-establishment to a base station apparatus on an E-UTRA side,
triggering a release of an NR secondary cell group in Multi-RAT Dual Connectivity (MR-DC) in a case that NGEN-DC is configured to the terminal apparatus, and
releasing an RLC entity for each RLC bearer configured in the NR secondary cell group in the MR-DC in a case that the release of the NR secondary cell group in the MR-DC is triggered.

4. A method of a base station apparatus, the method comprising:
receiving a request for RRC connection re-establishment from an E-UTRA side of a terminal apparatus, wherein in a case of receiving the request for RRC connection re-establishment,
a release of an NR secondary cell group in Multi-RAT Dual Connectivity (MR-DC) is triggered in a case that NG-RAN E-UTRA-NR Dual Connectivity (NGEN-DC) is configured to the terminal apparatus, and
an RLC entity for each RLC bearer configured in the NR secondary cell group in the MR-DC is released in a case that the release of the NR secondary cell group in the MR-DC is triggered.

* * * * *